(12) United States Patent
Bastioli et al.

(10) Patent No.: US 8,541,109 B2
(45) Date of Patent: Sep. 24, 2013

(54) BIODEGRADABLE POLYESTER, PREPARATION PROCESS THEREOF AND PRODUCTS COMPRISING SAID POLYESTER

(75) Inventors: Catia Bastioli, Novara (IT); Angelos Rallis, Novara (IT)

(73) Assignee: Novamont S.p.A., Novara (IT)

( * ) Notice: Subject to any disclaimer, the term of this patent is extended or adjusted under 35 U.S.C. 154(b) by 349 days.

(21) Appl. No.: 12/934,011

(22) PCT Filed: Mar. 26, 2009

(86) PCT No.: PCT/EP2009/053586
§ 371 (c)(1),
(2), (4) Date: Sep. 22, 2010

(87) PCT Pub. No.: WO2009/118377
PCT Pub. Date: Oct. 1, 2009

(65) Prior Publication Data
US 2011/0020660 A1    Jan. 27, 2011

(30) Foreign Application Priority Data

Mar. 26, 2008 (IT) .................................. MI08A0507

(51) Int. Cl.
*B32B 27/06* (2006.01)
*B32B 27/08* (2006.01)
*B32B 27/10* (2006.01)
*B32B 27/36* (2006.01)
*C08G 63/02* (2006.01)
*C08G 63/08* (2006.01)
*C08G 63/12* (2006.01)
*C08G 63/127* (2006.01)
*C08G 63/16* (2006.01)
*C08G 63/181* (2006.01)
*C08G 63/183* (2006.01)
*C08L 67/02* (2006.01)

(52) U.S. Cl.
USPC ........... 428/481; 428/480; 528/288; 528/297; 528/308; 528/308.6; 525/437; 525/444

(58) Field of Classification Search
None
See application file for complete search history.

(56) References Cited

U.S. PATENT DOCUMENTS 5,661,193 A * 8/1997 Khemani ....................... 521/182
5,714,569 A * 2/1998 Imaizumi et al. ............. 528/272

(Continued)

FOREIGN PATENT DOCUMENTS

EP           1721935 A1    11/2006
WO     WO-99/14268 A1     3/1999

(Continued)

OTHER PUBLICATIONS

Database WPI Week 200518, Thomson Scientific, London, GB; AN 2005-167817, XP002537024 & JP 2005 036179 A (Mitsubishi Chem Corp) Feb. 10, 2005 abstract.

(Continued)

*Primary Examiner* — Vivian Chen
(74) *Attorney, Agent, or Firm* — Novak Druce Connolly Bove + Quigg LLP

(57) ABSTRACT

The invention relates to a biodegradable polyester, particularly suitable for extrusion coating, comprising units deriving from at least a diacid and at least a diol, with long chain branches (isometric with respect to the main chains of the polyester) and essentially gel-free, characterized by optimum adhesion to paper, excellent sealability and processability in extrusion coating systems. Said biodegradable polyester is obtainable through a reactive extrusion process starting from a substantially linear polyester precursor with defined viscosity and concentration of reactive sites which allow transformation of a few chains of the polyester precursor into isometric branches of this polyester. A further object of the present invention is a laminate product composed of at least a backing, preferably paper, and of at least a first layer composed of polyester according to the invention.

20 Claims, 4 Drawing Sheets

(56) References Cited

U.S. PATENT DOCUMENTS

2007/0203261 A1* 8/2007 Narayan et al. ............... 523/205
2012/0025230 A1* 2/2012 Yan et al. ......................... 257/93
2012/0178896 A1* 7/2012 Bastioli et al. ................ 528/274

FOREIGN PATENT DOCUMENTS

| WO | WO-03/089490 A2 | 10/2003 |
| WO | WO-2004/101666 A2 | 11/2004 |
| WO | WO-2006/097353 A1 | 9/2006 |

OTHER PUBLICATIONS

Database WPI Week 200377, Thomson Scientific, London, GB; AN 2003-820021, XP002537025 & JP 2003 221423 A (AEBA T) Aug. 5, 2003 abstract.

Database WPI Week 0835, Thomson Scientific, London, GB; AN 2008-F12899, XP002537026 & JP 2008 056851 A (Toyo Seikan Kaisha Ltd) Mar. 5, 2008 abstract & JP 2008 056851 (Toyo Seikan Kaisha Ltd) Mar. 13, 2008.

* cited by examiner

BIODEGRADABLE POLYESTER, PREPARATION PROCESS THEREOF AND PRODUCTS COMPRISING SAID POLYESTER

CROSS REFERENCE TO RELATED APPLICATIONS

This application is a National Phase filing under 35 U.S.C. §371 of PCT/EP2009/053586 filed on Mar. 26, 2009; and this application claims priority to Application No. MI2008A000507 filed in Italy on Mar. 26, 2008 under 35 U.S.C. §119; the entire contents of all are hereby incorporated by reference.

BACKGROUND OF THE INVENTION

1. Field of the Invention

The present invention relates to a biodegradable polyester, particularly suitable for extrusion coating, comprising units deriving from at least a diacid and at least a diol, with long chain branches (isometric with respect to the main chains of the polyester) and essentially gel-free, characterized, with respect to conventional biodegradable polyesters of similar viscosity, by higher melt strength, higher breaking stretching ratio, lower neck-in and, moreover, characterized by optimum adhesion to paper, excellent sealability and processability in extrusion coating systems.

The biodegradable polyester according to the invention is obtainable through a reactive extrusion process starting from a polyester precursor comprising units deriving from at least a diacid and at least a diol, substantially linear, with defined viscosity and concentration of reactive sites, preferably such as terminal functional groups which, due to specific reagents capable of reacting with these reactive sites, allow transformation of a few chains of the polyester precursor into isometric branches of this polyester. A further object of the present invention is a laminate product composed of at least a backing, preferably paper, and of at least a first layer composed of polyester according to the invention.

2. State of the Art

Lamination of paper backings with polymer materials is an extremely useful process as it allows improvement of the toughness, water resistance and barrier properties of the paper and it opens further processing options such as heat sealing. However, paper laminates with polymers, such as polyethylene, are not easy to recycle or dispose of, as the polyethylene can only be separated from the paper with great difficulty during the recycling process. Recycling or disposal of the polymer layer removed during treatment thus represents a very serious problem at the end of the life cycle of paper laminates.

US2006/0051603 A1 describes paper laminates with polyesters from diacid-diol. The use of polymers of this type is advantageous as, once separated from the paper, they can be composted. Alternatively, the entire laminate product can be composted. However, US20006/0051603 A1 describes a laminate containing at least two polymer layers composed of two different polyesters having different thermal behaviour and different properties of adhesion to paper.

BRIEF SUMMARY OF THE INVENTION

The present invention relates to a biodegradable polyester, particularly suitable for extrusion coating, comprising units deriving from at least a diacid and at least a diol with long chain branches, substantially gel-free, characterized in molten state by shear viscosity from 800 to 1600 Pas at a flow gradient $\gamma=103.7$ s$^{-1}$ measured at 180° C. with a capillary having a diameter=1 mm and L/D=30, Thermal Stability Constant of less than $1.5\times10^{-4}$ at 180° C. and $\gamma=103.7$ s$^{-1}$, Melt Strength from 2 to 4.5 at 180° C., Breaking Stretching Ratio>30 at 180° C. Preferably, the polyester according to the invention has Melting Temperature from 55 to 170° C., Elastic Modulus from 40 to 1000 MPa and weight average molecular weight $M_w$ measured by GPC between 115000 and 200000. The aforesaid biodegradable polyester is preferably obtained through a reactive extrusion process starting from a substantially linear polyester precursor from diacid-diol with MFI of 5-30 g/10 min at 190° C. and 2.16 kg, and containing active sites. Said polyester precursor preferably has a weight average molecular weight measured by GPC ranging from 80,000 to 160,000. In the meaning of the present invention with the expression "active site" of polyester precursor is meant a terminal functional group which allows the transformation reaction of the polyester precursor chain into isometric branches of the polyester itself.

Such active sites can be, for example, terminal unsaturations, in quantities of 0.1-1% by moles measured by H1 NMR 300 MHz, or terminal acid groups in quantities of 10-200 meq of KOH/kg of polymer or both. Said reactive extrusion process is performed through the addition of a compound selected from peroxides, epoxides and carbodiimides.

In general, said biodegradable polyester can be described as "coating grade" as it can be processed with equipment for extrusion coating normally used for the lamination of paper with polyethylene. Preferably, the "coating grade" polyester is obtained through adding organic peroxides to a substantially linear polyester.

The present invention also relates to a laminate product comprising at least a rigid or flexible backing and at least a first layer comprising the biodegradable polyester for extrusion coating according to the invention.

DETAILED DESCRIPTION OF THE INVENTION

Figure 1:
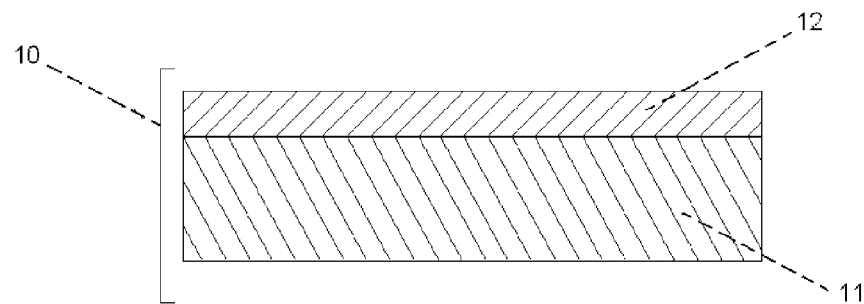
FIG. 1 is a cross section of the laminate according to the invention. 10 indicates the laminate product, 11 the backing, 12 the layer of biodegradable polymer according to the invention.
Figure 2A:
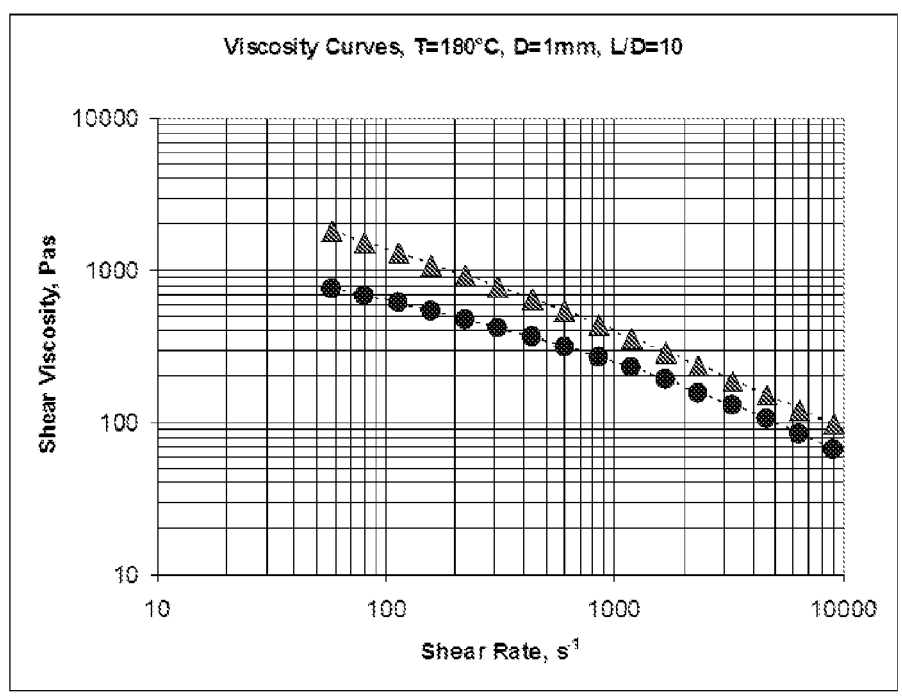
FIGS. 2a and 2b show the viscosity/flow gradient curves of two polymers according to the invention (triangle) compared with their substantially linear polymer precursors (circle). A noteworthy increase can be seen in the viscosity values of both polymers according to the invention in the area with low shear rate values, i.e. those values typical of the head of extrusion coating systems.
Figure 2B:
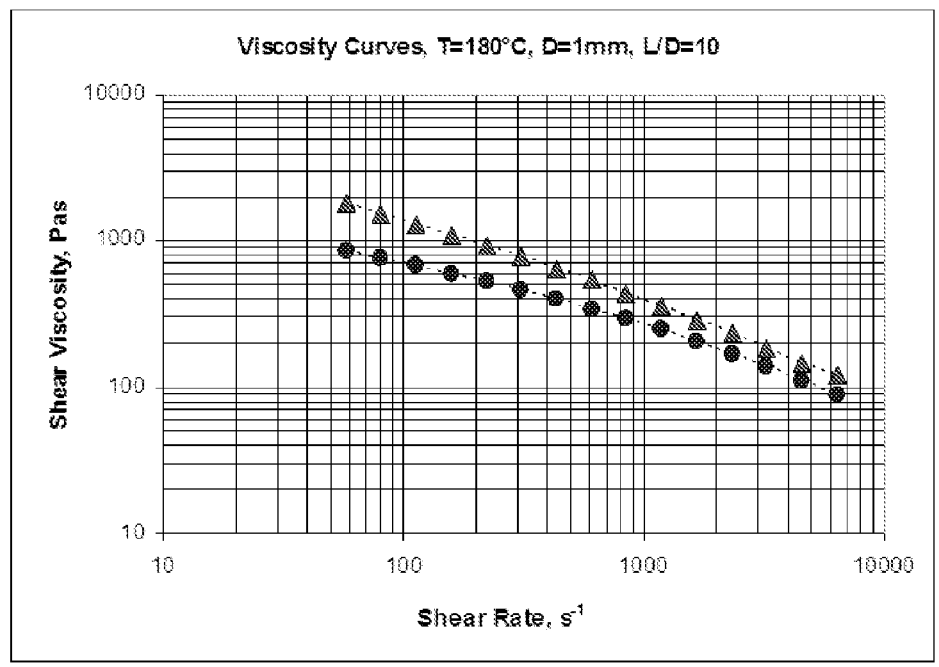
Figure 3A:
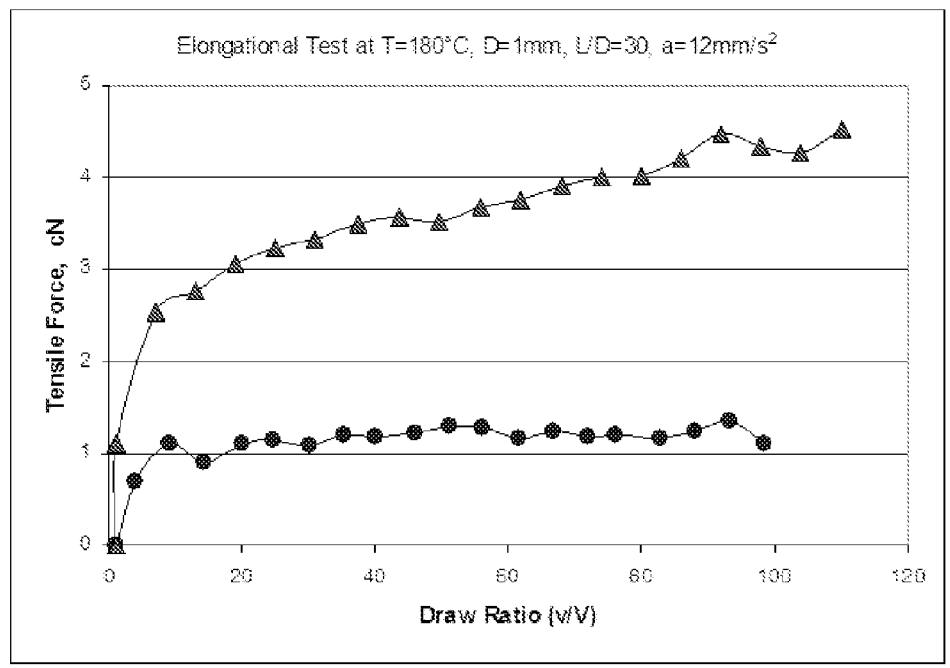
FIGS. 3a and 3b show the tensile curves in elongation (Force vs. Draw ratio) obtained with capillary rheometer on materials in molten state. The polymers according to the invention (triangle) are compared with their substantially linear polymer precursors (circle). The noteworthy increase in the melt strength of the polymer according to the invention with respect to the polymer precursor is entirely evident.
Figure 3B:
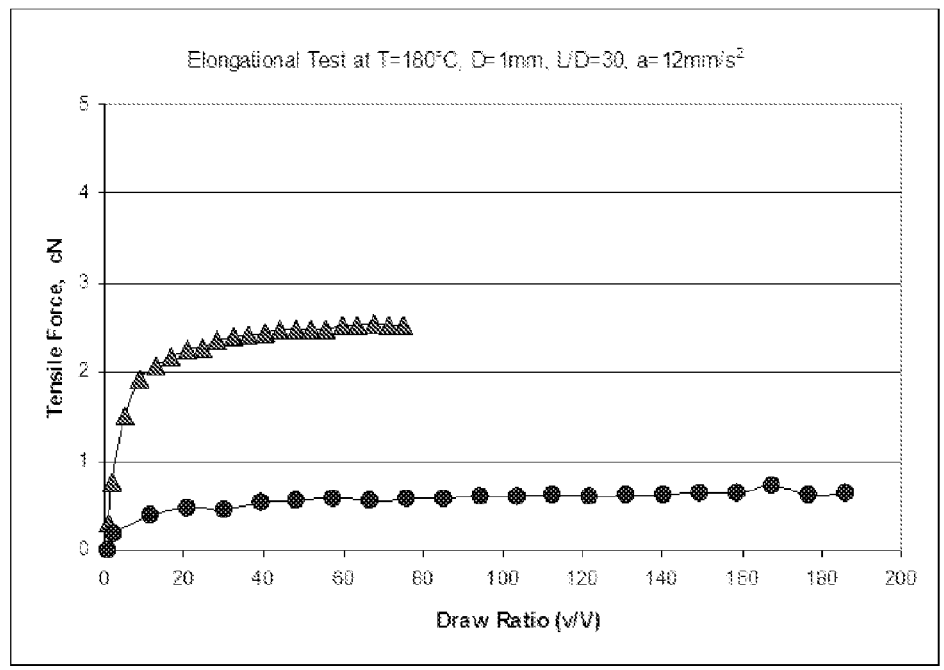
Figure 4A:
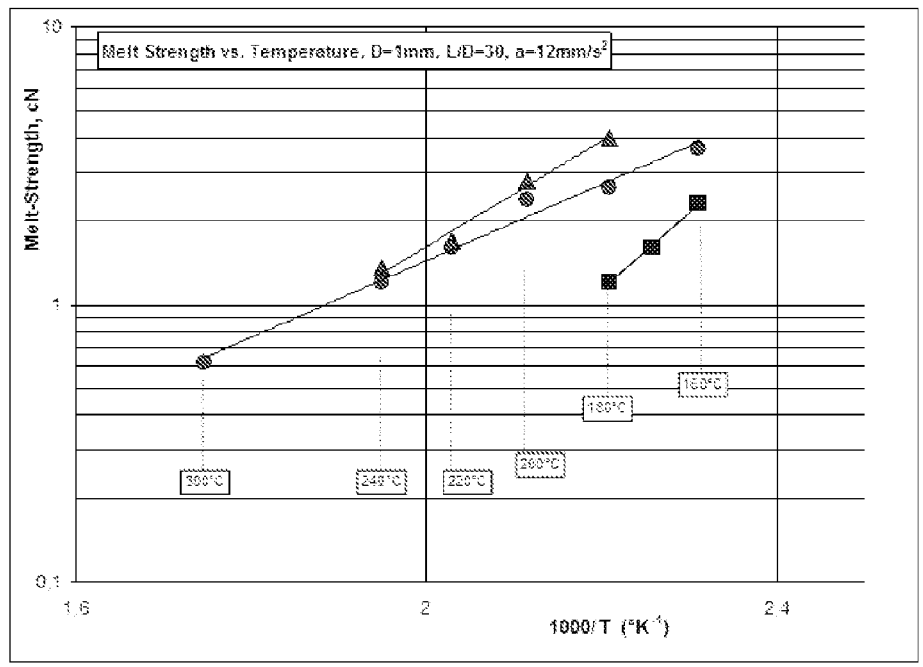
FIGS. 4a and 4b show two curves with melt strength values at various temperatures for the polymer according to the invention (triangle), its substantially linear polymer precursor (square) and a low density polyethylene for extrusion coating (circle, Novex 19 N 430). As can be noted, both polymers according to the invention have melt strength values entirely comparable with those of the low density polyethylene, with evident differences to their polyester precursors.
Figure 4B:
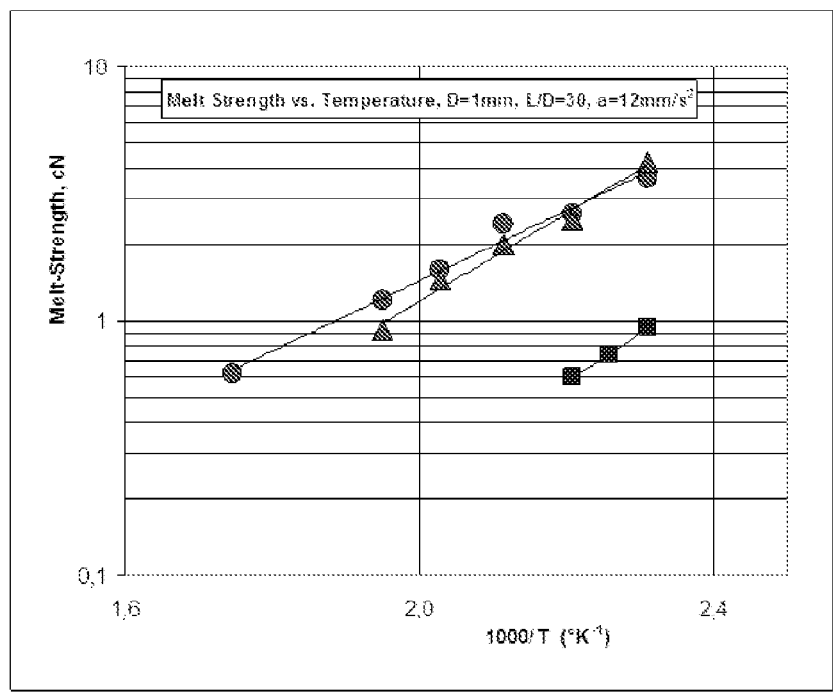

Preferably, the biodegradable polyester from diacid-diol with long chain branches and essentially gel-free according to the present invention is obtainable through a reactive extrusion process, said reactive extrusion process being performed by adding peroxides in quantities ranging from 0.001 to 0.1%, preferably 0.004-0.09%, and more preferably from 0.006-0.03% by weight with respect to the polyester precursor, epoxides in quantities of 0.05-1%, preferably 0.2-0.5% by weight with respect to the polyester precursor, carbodiimides in quantities of 0.05-1.5%, preferably 0.1-1% and more preferably of 0.15-0.8% by weight with respect to the polyester precursor.

Examples of peroxides that can advantageously be used are selected from the group of dialkyl peroxides, such as: benzoyl peroxide, lauroyl peroxide, isononanoyl peroxide, di-(t-butylperoxyisopropyl)benzene, t-butyl peroxide, dicumyl peroxide, alpha,alpha'-di(t-butylperoxy)diisopropylbenzene, 2,5-dimethyl-2,5 di(t-butylperoxy)hexane, t-butyl cumyl peroxide, di-t-butylperoxide, 2,5-dimethyl-2,5-di(t-butylperoxy)hex-3-yne, di(4-t-butylcyclohexyl)peroxydicarbonate, dicetyl peroxydicarbonate, dimyristyl peroxydicarbonate, 3,6,9-triethyl-3,6,9-trimethyl-1,4,7-triperoxonan, di(2-ethylhexyl)peroxydicarbonate and mixtures thereof.

Examples of epoxides that can advantageously be used are all polyepoxides from epoxidized oils and/or from styreneglycidyl ether-methylmetacrylate, glycidyl ether methylmetacrylate included in a range of molecular weights between 1,000 and 10,000 and with a number of epoxides per molecule ranging from 1 to 30 and preferably from 5 to 25, and epoxides selected from the group comprising: diethylene glycol diglycidyl ether, polyethylene glycol diglycidyl ether, glycerol polyglycidyl ether, diglycerol polyglycidyl ether, 1,2-epoxybutane, polyglycerol polyglycidyl ether, isoprene diepoxide, and cycloaliphatic diepoxide, 1,4-cyclohexanedimethanol diglycidyl ether, glycidyl 2-methylphenyl ether, glycerol propoxylate triglycidyl ether, 1,4-butanediol diglycidyl ether, sorbitol polyglycidyl ether, glycerol diglycidyl ether, tetraglycidyl ether of meta-xylenediamine and diglycidyl ether of bisphenol A, and mixtures thereof.

Catalysts can also be used to increase the reactivity of the reactive groups. In the case of polyepoxides, salts of fatty acids can, for example, be used. Calcium and zinc stearates are particularly preferred.

Examples of carbodiimides that can advantageously be used are selected from the group comprising: poly(cyclooctylene carbodiimide), poly(1,4-dimethylene cyclohexylene carbodiimide), poly(cyclohexylene carbodiimide, poly(ethylene carbodiimide), poly(butylene carbodiimide), poly(isobutylene carbodiimide), poly(nonylene carbodiimide), poly(dodecylene carbodiimide), poly(neopentylene carbodiimide), poly(1,4-dimethylene phenylene carbodiimide), poly(2,2',6,6', tetra-isopropyl-diphenylene carbodiimide), (Stabaxol® D), poly(2,4,6-triisopropyl-1,3-phenylene carbodiimide) (Stabaxol® P-100), poly(1,3,5-triisopropyl-phenylene-2,4-carbodiimide), poly(2,6 diisopropyl-1,3-phenylene carbodiimide) (Stabaxol® P), poly(tolyl carbodiimide), poly(4,4'-diphenylmethane carbodiimide), poly(3,3'-dimethyl-4,4'-biphenylene carbodiimide), poly(p-phenylene carbodiimide), poly(m-phenylene carbodiimide), poly(3,3'-dimethyl-4,4'-diphenylmethane carbodiimide), poly(naphthylene carbodiimide), poly(isophorone carbodiimide), poly(cumene carbodiimide), p-phenylene bis(ethylcarbodiimide), 1,6-hexamethylene bis(ethylcarbodiimide), 1,8-octamethylene bis(ethylcarbodiimide), 1,10-decamethylene bis(ethylcarbodiimide), 1,12 dodecamethylene bis(ethylcarbodiimide) and mixtures thereof. Preferably, the polyester from diacid-diol according to the present invention is characterized in molten state by shear viscosity of 900-1300 Pas, more preferably of 1000-1250 Pas at 180° C. and flow gradient $\gamma=103.7$ $s^{-1}$, Thermal stability constant of less than $1\times10^{-4}$, more preferably of less than $0.8\times10^{-4}$ at 180° C., melt strength of 2.3-4 and more preferably of 2.5-3 g at 180° C., breaking stretching ratio>50 and more preferably >70 at 180° C.

Preferably, the polyester from diacid-diol according to the present invention has Melting Temperatures of 70-160° C. and more preferably of 100-145° C., elastic modulus of 50-600 MPa and more preferably of 70-250 MPa, and weight average molecular weight $M_w$ between 120,000 and 180,000 and more preferably between 130,000 and 160,000.

The biodegradable polyester according to the present invention surprisingly shows a melt strength at 240° C. in the order of approximately twice the value of the same parameter of an LDPE grade for extrusion coating MFI=7 g/10 min at 300° C.

The polyester from diacid-diol according to the present invention can preferably be obtained by means of an extrusion process starting from a substantially linear polyester precursor with MFI of 7-20 and more preferably 9-15 g/10 min at 190° C. and 2.16 kg, shear viscosity of 500-700 Pas at 180° C. with flow gradient $\gamma=103.7$ $s^{-1}$. Preferably, the polyester precursor has weight average molecular weight $M_w$ between 100,000-130,000. The aforesaid reactive extrusion process must allow a few chains of the substantially linear polyester precursor to become branches of the polyester according to the invention as a result of reagents capable of exploiting the terminal reactive sites of the polyester precursor, such as functional groups, with a concentration compatible with attainment of an essentially gel-free polyester such as the polyester according to the invention.

Preferably, the biodegradable polyester according to the invention is obtainable by a reactive extrusion process starting from a substantially linear polyester precursor with a terminal unsaturation content of 0.1-0.8%, preferably 0.2-0.7% by moles measured by H1 NMR 300 MHz.

With regard to measurement of the unsaturation content, it can be implemented by H1 NMR 300 MHz using a pulse-acquisition sequence characterized by a 30° pulse phase, a spectral range=4 kHz; a delay of 5 seconds and performing 6000 scans.

Terminal unsaturations can be generated through controlled degradation during the polymerization phase or during processing of the polymer precursor, or through the addition of suitable unsaturated monomers.

With controlled degradation is meant a thermal treatment during which the polymer is maintained above its melting temperature in a closed environment for the time necessary to generate the unsaturations.

Preferably, the biodegradable polyester according to the invention is obtainable by a reactive extrusion process starting from a substantially linear polyester precursor having a content of terminal acid groups in quantities of 10-200, more preferably 15-150, even more preferably 20-70 meq of KOH/kg of polymer.

These polyester precursors from diacid-diol, substantially linear, are advantageously selected from aliphatic and aliphatic-aromatic biodegradable polyesters.

With regard to aliphatic polyesters from diacid-diol, they are obtained starting from aliphatic diacids and from aliphatic diols.

With regard to aliphatic-aromatic polyesters, they have the aromatic part mainly composed of polyfunctional aromatic acids and the aliphatic part composed of aliphatic diacids and aliphatic diols and mixtures thereof.

Polyfunctional aromatic acids are intended as dicarboxylic aromatic compounds of the phthalic acid type and esters thereof, preferably terephthalic acid, furandicarboxylic acid and esters thereof, preferably 2,5-furandicarboxylic acid, and their combinations.

Aliphatic diacids are intended as aliphatic dicarboxylic acids with number of carbons from $C_2$ to $C_{13}$ and esters thereof, such as oxalic acid, malonic acid, succinic acid, glucaric acid, adipic acid, pimelic acid, suberic acid, azelaic acid, sebacic acid, undecanoic acid, dodecanoic acid and brassilic acid.

Dicarboxylic acids from renewable sources, esters and mixtures thereof, such as sebacic acid, azelaic acid, brassilic acid and succinic acid, more preferably sebacic acid, are preferred. In the diacid-diol type polyesters according to the present invention, diols are intended as compounds with two hydroxylic groups. The aliphatic diols $C_2$ to $C_{13}$ are preferred.

Examples of aliphatic diols include: 1,2-ethanediol, 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,4-cyclohexanedimethanol, neopentyl glycol, 2-methyl-1,3-propandiol, dianhydrosorbitol, dianhydromannitol, dianhydroiditol, cyclohexanediol, cyclohexanemethanediol, isosorbide and mixtures thereof. Butanediol and ethylene glycol and mixtures thereof are particularly preferred.

The substantially linear aliphatic-aromatic polyesters are characterized by a content of aromatic acids ranging from 40 to 70%, preferably from 45 to 60% by moles, and more preferably between 50 and 60% by moles.

Advantageously, branching agents can be added to the polymer precursors in quantities of less than 0.5%, preferably less than 0.2%. Said branching agents are selected from the group of polyfunctional molecules, such as polyacids, polyols, polyepoxys and mixtures thereof.

Examples of polyacids are: 1,1,2 ethanetricarboxylic acid, 1,1,2,2 ethanetetracarboxylic acid, 1,3,5 pentatricarboxylic acid, 1,2,3,4 cyclopentatetracarboxylic acid, malic acid, citric acid, tartaric acid, 3-hydroxyglutaric acid, mucic acid, trihydroxyglutaric acid, hydroxy isophthalic acid, derivatives and mixtures thereof.

Examples of polyols are: glycerol, hexantriol, pentaerythritol, sorbitol, trimethylolethane, mannitol, 1,2,4 butanetriol, xylitol, 1,1,4,4-tetrakis(hydroxymethyl)cyclohexane, arabitol, adonitol, iditol and mixtures thereof.

The aliphatic and aliphatic-aromatic polyesters of the invention can contain comonomers of the hydroxy acid type in percentages not exceeding 30% and preferably not exceeding 20%, both random and in blocks.

Hydroxy acids of the D and L lactic, glycolic, butyric, valeric, hexanoic, heptanoic, octanoic, nonanoic, decanoic, undecanoic, dodecanoic, tridecanoic, tetradecanoic, pentadecanoic, hexadecanoic, heptadecanoic and octadecanoic acid type are preferred. Hydroxy acids of the type with 3 or 4 carbons in the main chain are preferred.

Although less preferable, the invention can also include polyesters of the hydroxy acid type with carbons in the main chain on average greater than 4.

Mixtures of the different polyesters of the invention are also included in the invention.

Biodegradable polyesters according to the invention are preferably biodegradable according to the standard EN 13432.

The chemical-physical characteristics of the polyester according to the present invention are such as to guarantee, during the extrusion coating process, high strength and heat stability of the melt, low neck-in (difference between the width of the polymer laminate layer delivered from the extruder and the width of the polymer laminate layer on the paper backing), limited variation of the cross-section (due to draw resonance or web instability phenomena) of the melt film, high breaking stretching ratio and acceptable motor power consumption of the extruder.

With regard to measurement of the shear viscosity of the melt, the standard ASTM D-3835-90 "Standard Test Method for Determination of Properties of Polymeric Materials by Means of a Capillary Rheometer" is used at T=180° C., $\gamma=103.7$ $s^{-1}$ with a capillary D=1 mm and L/D=30. With regard to measurement of the melting temperature, it can be measured by differential scanning calorimetry (DSC). The determination can be performed with the following thermo profile:

$1^{st}$ scan from −20° C. to 180° C. at 20° C./min;
$2^{nd}$ scan from 180° C. to −20° C. at 10° C./min;
$3^{rd}$ scan from −20° C. to 180° C. at 20° C./min;

The melting temperature is taken as endothermic-peak value in the thermogram of the $3^{rd}$ scan.

The Elastic Modulus is measured according to the standard ASTM D-638-91 "Standard Test Method for Tensile Properties of Plastics". The elastic modulus can also be measured according to the standard ASTM D-882-91 (traction at 23° C. and 55% RH, Vo=50 mm/min) With regard to the weighted average molecular weight $M_w$, it can be measured by gel permeation chromatography. The determination can be performed with the system maintained at a temperature of 40° C., using a set of three columns in series (particle diameter of 5 μand porosity of 500 Å, 1,000 Å and 10,000 Å, respectively), a refraction index detector, chloroform as eluent (flow 1 ml/min) and using polystyrene as a reference standard.

With regard to measurement of the MFI, it is measured at 190° C. and 2.16 kg according to the standard ASTM D-1238-89 "Standard Test Method for Melt Flow Rates of Thermoplastics by Extrusion Plastometer".

The measurement of terminal acid groups can be carried out as follows: 1.5-3 g of the polyester according to the invention are placed into a 100 ml Erlenmeyer flask. 60 ml of chloroform are added to dissolve the resin. After complete dissolution 25 ml of 2-propanol and, just before the determination, 1 ml of deionised water are added. The solution thus obtained is titrated with a preliminary standardized KOH/ethanol solution using a suitable indicator for the determination of the equivalence point of the titration, such as for example a glass electrode designed for use with nonaqueous acid-base titrations. The terminal acid group content is calculated from the consumption of the KOH/ethanol solution based on the following equation:

$$\text{Terminal acid group content (meq KOH/kg of polymer)} = \frac{\lfloor (V_{eq} - V_b) \cdot T \rfloor \cdot 1000}{P}$$

wherein: $V_{eq}$=ml of KOH/ethanol solution at the equivalence point for the titration of the sample;
$V_b$=ml of KOH/ethanol solution necessary to arrive at pH=9.5 during the blank titration;
T=concentration in moles/l of the KOH/ethanol solution;
P=g of sample.

With regard to the thermal stability constant (K) of the melt, it is measured according to the standard ASTM D 3835-Appendix maintaining the melt at a given temperature and measuring, at two different times, the viscosity value of the melt. The thermal stability constant (K) is expressed as (ln $(\eta 1/\eta 2))/(t2-t1)$, i.e. ratio between natural logarithm of $(\eta 1/$ η2) and difference (t2−t1), where t1 and t2 indicate two different permanence times of the melt at the test temperature and η1 and η2 indicate the respective viscosities of the melt. The test is performed at T=180° C., $\gamma$=103.7 s$^{-1}$ with a capillary D=1 mm and L/D=30.

With regard to the melt strength and the breaking stretching ratio, they are measured according to the International Standard ISO 16790:2005, at 180° C. and $\gamma$=103.7 s$^{-1}$ using a capillary with a diameter of 1 mm and L/D=30 and drawn with a constant acceleration of 12 mm/sec$^2$ and with a drawing length of 110 mm. The value of the breaking stretching ratio is represented by the maximum value of the stretch ratio before the set up of the resonance instability area of the tensile elongation curve of the polymer. The stretch ratio is the ratio of the drawing speed to the velocity of the melt at the exit of the capillary. The melt strength is the maximum force recorded on the molten filament before the set up of the resonance instability area of the tensile elongation curve.

Numerical values reported in the specification and in the claims of this applications should be understood to include numerical values which differ from the stated value by less than experimental error of the conventional measurement techniques of the type described in the present application to determine the value.

The characteristic melt strength of the polyesters from diacid-diol according to the invention is in particular linked to the presence of long chain branches. Said characteristic allows the polymer to be used with extreme effectiveness in common equipment for extrusion coating guaranteeing low neck-in values even at very low thicknesses of the layer of melt, high web stability of the polymer curtain, high processing speeds and high temperatures.

In the meaning of the present invention, with high web stability is meant an oscillation of the polymer curtain edge less than 10 mm. In particular, this high web stability of the polymer curtain is comparable with that of an LDPE grade for extrusion coating. Due to the high web stability of its melt curtain, the polymer according to the present invention causes an extremely low oscillation of the polymer curtain edges, preventing quality problems also at high processing speeds.

The reactive extrusion process according to the present invention in fact causes the melts to take flow curves similar to the curves of commercial polyesters (such as Ecoflex® 7011 by BASF AG), but with completely different melt strength. The biodegradable polyesters according to the invention are in fact capable of withstanding tensile forces applied even at much higher temperatures than the melting temperatures of normal polyesters on the market, thereby allowing both a drastic reduction in neck-in phenomena and the web stability of the melt curtain necessary for the industrial extrusion coating process.

The biodegradable polyesters according to the invention, due to the combination of high fluidity, high elasticity, high melt strength and high breaking stretching ratio, allow extremely thin films to be produced with a higher melt stability than PVC for food grade films. These films can also be characterized by high transparency, in particular when the reactive extrusion process is conducted using peroxides as reactive species, as they are added in very small quantities. This aspect renders the polymer of this invention particularly suitable for food contact.

The high thermal stability of the melt of the polyesters according to the invention allows paper laminates to be produced with extrusion coating processes at temperatures up to 300° C. These temperatures are entirely comparable with those used in conventional systems that use polyethylene. This high thermal stability together with the high web stability of the melt curtain delivered from the extruder, represents a clearly distinguishing element of the polymer for extrusion coating according to the invention with respect to common biodegradable polyesters on the market, such as Eastar-bio® by Eastman Chemical, or Polylactic Acids, which cannot be processed at such high temperatures due to their lower thermal stability.

The viscosity values in molten state of the polyesters according to the invention also allow effective adhesion to paper backings. They are also capable of guaranteeing high productivity at the usual processing temperatures, without this compromising the thermal stability of the polymer.

The aforesaid chemical-physical characteristics allow the polyester according to the present invention to be effectively fed to conventional extrusion coating systems typically used for polyethylene without particular modifications to the structure and to the conditions of use of the machinery. In fact, the specific combination of thermal, elastic and rheo logical properties of the polymer according to the invention allows it to be defined as "coating grade". This allows appreciation of a further significant difference of the polymer according to the invention with respect to common polyesters, such as Eastar-bio® and Ecoflex®, which instead present significant difficulties during processing in common extrusion coating systems, above all due to problems of neck-in and instability of the melt curtain, unless particularly complex modifications are made.

In a particularly preferred embodiment, the essentially gel-free biodegradable polyester from diacid-diol with long chain branches is obtained through reactive extrusion with organic peroxides.

Naturally, the biodegradable polyester according to the invention can be mixed with other biodegradable and non-biodegradable polymers.

Types of polymers that can be blended with the polyesters of the invention include polyolefins, polyamides, aliphatic and aliphatic aromatic polyesters, polybutyleneterephthalate, polyethyleneterephthalate and polytrimethyleneterephthalate, and combinations thereof. Other polymers can be destructured and complexed starches and modified starches as described in the Novamont patents, polyalcohols and derivatives, hydroxypropylcellulose, cellulose acetate, cellulose propionate, cellulose butyrate, cellulose alkanoate and combinations thereof both as copolymers and blends, plasticized or not, esters of cellulose in general, biodegradable aliphatic polyesters, ethers, urethanes, aliphatic-aromatic polyesters. In the case of polyols and derivatives, these include PVOH as is and modified with plasticizers such as glycerol, ethylene glycol, pentaerytritol, sorbitol, mannitol, etc., and combinations thereof also with polyalkeneoxy acrylate available as Vinex by Air Products and Chemicals. An example of derivative of hydroxypropylcellulose or hydroxypropyl starch includes hydroxypropylcellulose—non ionic cellulose ether, of the type KLUCEL manufactured by Hercules. Cellulose esters include acetates (Tenites Eastman also including propionates and butyrates), cellulose acetate propionate, and cellulose acetate butyrate. Examples of biodegradable aliphatic polyesters include polyhydroxybutyrate (PHB), polyhydroxybutyrate-valerate (PHBV), polyhydroxybutyrate alkanoates of the type $C_6$-$C_{22}$, polycaprolactone, polybutylene succinate on the market as Bionolle 1000 Showa, polybutylene succinate adipate of the type Bionolle 3000 Showa, polyglycolic acid (PGA), various grades of polylactic acid (PLA), polybutylene oxalate, polyethylene adipate, polyparadioxanone. Examples of ethers include polypropylene oxide and copolymers of polypropylene oxide and polyethylene oxide and copolymers of polyethylene oxide. Examples of polycarbonates include polyethylene carbonate, polybutylene carbonate, and polytrimethylene carbonate and derivatives thereof. Examples of urethanes include urethanes from polyesters and polyethers and mixtures thereof. Aliphatic-aromatic polyesters include polybutylene succinate-co-terephthalate of the type Biomax Dupont. In a particularly preferred embodiment, said polymers can be mixed in quantities of less than 20% in weight to the biodegradable polyester according to the invention.

The biodegradable polyester according to the invention can also be mixed with process additives, such as release agents, plasticizers, fillers, lubricants, nucleating agents and surfactants, antistatic agents, pigments and additives to improve adhesion. Known polymer additives with low molecular weight can also be added to increase the tackiness of the film, as in the case of self sealing food grade films.

With regard to release agents, they can be added to the polyester according to the invention to promote release of the polymer surface layer of the paper laminate from the chill roll of the extrusion coating system. In fact, the chill roll should generally be kept at a high temperature without however creating problems of adhesion of the polymer to the roll. This approach prevents phenomena of condensation on the chill roll. In the case of the polyester of the invention, the chill roll is generally kept at the same or at a higher temperature than the ambient temperature. The glass transition temperature of the polyester of the invention is generally below that of the chill roll. For this reason, it may be useful to add additives that allow a significant reduction in adhesion to the chill roll.

These additives can be added in two ways: either by adding polymers capable of forming particles dispersed in the melt of the polyester of the invention having a higher vitreous transition temperature than the temperature of the chill roll and with a high viscosity at low shear rates or by adding one or more release agents (both directly and as masters) which migrate to the surface to create a thin layer that prevents phenomena of tackiness.

In the case of adding polymers capable of forming particles dispersed in the melt, the presence of solid particles on the surface of the chill roll decreases the contact surface therewith, thus reducing phenomena of adhesion. For the second case, derivatives of cellulose and of starches as is and plasticized are particularly interesting. Acetate propionates and acetate butyrates of the cellulose, plasticized or not with acetine, are particularly suitable.

In the case of adding release agents which migrate to the surface and create a thin layer that prevents phenomena of tackiness, they can advantageously be selected from the group comprising the esters of fatty acids and amides, and metal salts, soaps, paraffin or hydrocarbon waxes such as: zinc stearate, calcium stearate, aluminium stearate, stearamides, erucamides, behenamides, white beeswax, candelilla wax, LDPE with high MFI such as Eastman Epolene N21, Epolene E20 and Lofio HOB7119.

Plasticizers can be selected from the group of the esters of glycerine and in particular: glyceryl diacetate, glyceryl distearate.

With regard to fillers, they can be inorganic and/or organic. Examples of particularly preferred inorganic fillers are: talc, clays, silica, mica, kaolin, titanium dioxide and wollastonite. Preferred organic fillers derive from raw materials of renewable origin and are selected from the group comprising: cellulose and native starches or modified starches.

In combination or in alternative to the use of fillers, chemical or physical surface treatments can also be used, for example the addition of materials suitable to reduce the contact surface between the surface polymer layer of the paper laminate according to the present invention and the surface in direct contact therewith. Examples of these treatments are corona or flame treatments.

Lubricants are selected from the group comprising esters and metal salts of fatty acids, such as zinc stearate, calcium stearate, aluminium stearate and acetyl stearate.

Examples of nucleating agents include talc, saccharine sodium salt, calcium silicate, sodium benzoate, calcium titanate, boron nitride, isotactic polypropylene, PLA with low molecular weight and PBT.

Anionic, cationic and non ionic surfactants can be mixed with the essentially gel-free biodegradable polyester with long chain branches with the object of modifying the water permeability properties and in particular to increase the water transmission properties of the paper laminate according to the present invention.

Antistatic agents can be used in the invention. Preferred antistatic agents are cationic, anionic and non ionic surfactants.

With regard to cationic surfactants, they generally consist of a bulky cation often containing a long alkyl chain (for example, a quaternary ammonia, a phosphonium or solphonium salt) the quaternary group of which can optionally be part of a ring (i.e. imidazo line). In the majority of cases the anion is the chloride, sulphate or nitrate ion originated in the quaternization process.

Anionic surfactants are generally composed of alkyl sulfonates, sulfates, phosphates, phosphonates, dithiocarbamates, carboxylase generally neutralized by alkaline metals or alkaline earths.

Non ionic antistatic agents are neutral surfactants often having polarities significantly below the aforesaid ionic compounds and comprising polyethoxylate esters and ethers, esters or amides of fatty acids, mono and diglycerides of fatty amines.

Pigments and dyes or colour stabilizers can also be added if necessary, such as Titanium Dioxide, Clays, copper phthalocyanine, calcium carbonate, talc, mica, silica, silicates, iron oxides and hydroxides, carbon black and magnesium oxide.

In some applications it may be convenient to add additives to improve adhesion of the polymer layer to the substrate. In general, these agents can be referred to as sizing agents. It is deemed that these additives tend to reduce the viscosity of the polymer of the invention, and that this in turn facilitates adhesion of this polymer to the substrate, in particular to paper.

These additives will preferably be added in quantities ranging from 1 to 10% by weight and more preferable from 3 to 6% by weight.

The present invention also relates to a laminate product comprising at least a rigid or flexible backing, and at least a first layer comprising the biodegradable polyester for extrusion coating according to the invention.

In a preferred embodiment, the laminate product according to the present invention is composed of at least a rigid or flexible backing and of at least a first layer comprising at least 80% of the biodegradable polyester for extrusion coating according to the invention.

Typically, the biodegradable polyester according to the present invention is melted in an extrusion coating system, this melt being laminated on a rigid or flexible backing so as to obtain a laminate product. Rigid backings particularly preferred are backings composed of one or more layers of paper and cardboard.

With regard to the flexible backings, the present invention relates to multilayers in which the polyester of the invention is laminated with one or more other flexible films, or extruded over one or more other flexible substrates, such as those composed of PLA (polylactic acid), Cellophane, cellulose acetate, starch acetate, destructured starch or containing destructured starch, modified and non-modified.

In a particularly preferred embodiment, the laminate product according to the present invention is a multilayer wherein the backing is composed of one or more rigid backing and of one of more flexible backing.

In addition to the rigid or flexible backing and the biodegradable polyester according to the invention, one or more layers of different materials can be inserted in the laminate product according to the invention.

Examples of products obtainable with these multilayers are the multilayer products that combine layers of other polymers that modify the properties of the polymer of the invention in contact with the paper. In particular, this group comprises multiple laminate products with the outer surface having improved barrier properties, as in the case of containers for hot liquids, hamburger wrappers and containers for take-away foods.

In the case of high water barrier properties being required, it is also possible to perform vacuum treatments to deposit aluminum or silica/silicates on the outer layer of the laminate product according to the invention. Additionally, when high water and oxygen barrier properties are required, it is possible to coat, e.g. by means of extrusion coating processes, the biodegradable polyester according to the invention on mono- or multi-layered flexible films. Said flexible films preferably consist of biodegradable materials of renewable origin (such as for example PLA) having high elastic modulus and previously treated by means of vapor deposition with inorganic materials such as for example aluminum, silica and silicates. The toughness and the adhesive strength of the biodegradable polyester according to the invention prevent the formation of defects. This improves the performance of the layer coated with inorganic materials.

Due to its excellent qualities, the polyester according to the invention can in any case be used in processes other than extrusion coating, such as the film blowing process. The present invention therefore also includes the film blown with the polyester of the invention. In fact, due to its excellent melt stability, the polyester according to the invention allows optimum bubble processing thereof, with the possibility of obtaining films with a thickness of 5 um. It can therefore be used as extensible film for industrial and food packagings or as a component of coextruded films.

These films can be used in coextrusion as internal toughening layer, or as external waterproofing layer of film with high oxygen barrier composed of destructured starch and combinations thereof with hydrophilic and hydrophobic polymers or PLA. In any case, the films of the invention can contain the aforesaid polymers.

Articles obtained with laminate products according to the present invention are part of the invention. Said articles include: boxes, cups, plates, food packaging in general, such as tubs for butter, margarine, cheeses in general, bags or boxes for pet food, laminated paper foils for wrapping, containers and wrappers for different types of foods, among others hamburgers and meats, cups for ice cream and yogurt, lids, flexible films for food packaging with high water and oxygen barrier properties suitable for food products sensitive to oxidation and/or humidity and particularly biscuits, coffee and chips. Products obtained by extrusion-lamination, in which two layers of paper or card are bonded by a layer of the polyester of the invention, are also part of the invention. These semi-finished products can be used to obtain containers for sugar, detergents or in any case powders that are particularly sensitive to the air.

Finally, the biodegradable polyester according to the invention shows advantageous sealing properties which allow it to be used without adhesives.

EXAMPLES

Example 1

A polybutylene sebacate-co-terephthalate (PBST) with terephthalic acid content=56% by moles, with MFI=10 (at 190° C. and 2.16 kg), shear viscosity at 180° C. and $\gamma=103.7$ $s^{-1}=620$ Pas and terminal unsaturation content=0.48% in moles, was synthesized.

With regard to measurement of the unsaturation content, it was implemented by H1 NMR 300 MHz using a pulse-acquisition sequence characterized by a 30° pulse phase, a spectral range=4 kHz, a delay of 5 seconds and performing 6000 scans. The range of frequencies for determination is between 4.9 and 6.2 ppm. The sample to be analyzed was obtained by preparing a solution in deuterated chloroform of the polymer at a concentration of 65 mg/ml. 270 kg of this PBST in granule form were fed together with 40 g of alpha,alpha'-di(t-butylperoxy)diisopropylbenzene (LuperoxF) (corresponding to 0.0148% by weight with respect to the PBST) to a twin screw extruder in the following conditions:

extruder temperature profile: 30-100-200-170-150×3-160° C.
twin screw rotation speed: 240 rpm
head pressure: 98 kg/cm$^2$
active degassing.

The resulting product had shear viscosity at 180° C.=1194 Pas, Thermal stability constant=$0.58\times10^{-4}$, Melt Strength at 180° C.=2.8 g and Breaking Stretching Ratio at 180° C.>80.

The product thus obtained, in granule form, was then fed to an extrusion coating system having the following characteristics:

Extruder screw diameter=60 mm (L/D=30)
Extruder temperature profile: 210-230-250-260-240-235° C.
Extruder screw rotation speed: 70 rpm
Chill roll temperature: ambient
Head height (Air gap): 140 mm
Die lip opening=0.7 mm
Web width=550 mm
Line speed: 100 m/min
Paper used: cardboard for cups.

Example 2

A polybutylene sebacate-co-terephthalate (PBST) with terephthalic acid content=56% by moles, with MFI=11.1 (at 190° C. and 2.16 kg), shear viscosity at 180° C.=580 Pas and terminal unsaturation contents=0.42% by moles, was synthesized.

280 kg of this PBST in granule form were fed together with 67 g of alpha,alpha'-di(t-butylperoxy)diisopropylbenzene (LuperoxF) (corresponding to 0.0239% by weight with respect to the PBST) to a twin screw extruder in the following conditions:

extruder temperature profile: 30-100-200×3-180-155-165° C.
twin screw rotation speed: 200 rpm
head pressure: 93 kg/cm$^2$
active degassing.

The resulting product had shear viscosity at 180° C.=1170 Pas, Thermal stability constant=0,3×10$^{-4}$, Melt Strength at 180° C.=2.6 g and Breaking Stretching Ratio at 180° C.>50.

The product thus obtained, in granule form, was then fed to the same extrusion coating system of Example 1.

Example 3

A polybutylene sebacate-co-terephthalate (PBST) with terephthalic acid content=56% by moles, with MFI=10.6 (at 190° C. and 2.16 kg), shear viscosity at 180° C.=590 Pas and terminal unsaturation contents=0.51% by moles, was synthesized.

280 kg of this PBST in granule form were fed together with 45 g of alpha,alpha'-di(t-butylperoxy)diisopropylbenzene (LuperoxF) (corresponding to 0.016% in weight with respect to the PBST) to a twin screw extruder in the following conditions:
- extruder temperature profile: 30-100-200×3-180-155-165° C.
- twin screw rotation speed: 210 rpm
- head pressure: 94 kg/cm$^2$
- active degassing.

The resulting product had shear viscosity at 180° C.=1200 Pas, Thermal stability constant=0,2×10$^{-4}$, Melt Strength at 180° C.=2.9 g and Breaking Stretching Ratio at 180° C.>50.

The product thus obtained, in granule form, was then fed to the same extrusion coating system of Example 1.

Example 4

Comparison 280 kg of a polybutylene adipate-co-terephthalate (PBAT) with terephthalic acid content=47% by moles, with MFI=3.2 (at 190° C. and 2.16 kg), shear viscosity at 180° C.=1185 Pas and terminal unsaturation contents<0.1% by moles, were fed in granule form together with 33 g of alpha,alpha'-di(t-butylperoxy)diisopropylbenzene (LuperoxF) (corresponding to 0.012% by weight with respect to the PBAT) to a twin screw extruder in the following conditions:
- extruder temperature profile: 30-100-200×3-180-155-165° C.
- twin screw rotation speed: 210 rpm
- head pressure: 94 kg/cm$^2$
- active degassing.

The resulting product had shear viscosity at 180° C.=1125 Pas, Thermal stability constant=0.4×10$^{-4}$, Melt Strength at 180° C.=1.9 g and Breaking Stretching Ratio at 180° C.>80. It was then fed to the same extrusion coating system of Example 1.

The molten polymers of Example 1, 2 and 3 showed a high web stability and a low neck in of the polymer curtain. The laminate products obtained (semi-finished) showed excellent adhesion of the polymer layer to the paper substrate. The semi-finished products obtained were then used to produce, according to conventional processing techniques, ice cream and yogurt cups, with relative lids, characterized by excellent water barrier properties.

The molten polymer of Example 4, by contrast, showed a low web stability and a high neck in of the polymer curtain.

The invention claimed is:

1. Biodegradable aliphatic-aromatic polyester comprising units deriving from at least a diacid and at least a diol, said polyester having long chain branches, being essentially gel-free, and being characterized in the molten state by a Shear Viscosity, from 800 to 1,600 Pas measured according to the standard ASTM D-3835-90, at 180° C., a flow gradient γ=103.7 s$^{-1}$ with a capillary D=1 mm, L/D=30; by a Thermal Stability Constant K of less than 1.5×10$^{-4}$ measured according to the standard ASTM D-3835- Appendix at 180° C. a flow gradient γ=103.7 s$^{-1}$ with a capillary D=1 mm, L/D=30; by a Melt Strength from 2 to 4.5 g and by a Breaking Stretching Ratio>30 measured according to the International Standard ISO 16790:2005 at 180° C., a flow gradient γ=103.7 s$^{-1}$ with a capillary D=1 mm, L/D=30 and drawn with a constant acceleration of 12 mm/sec$^2$ and with a drawing length of 110 mm, said polyester being obtainable through a process characterized by comprising the reactive extrusion of a polyester precursor comprising units deriving from at least a diacid and at least a diol, said polyester precursor being linear, having a MFI of 5-30 g/10 min at 190° C. and 2.16 kg and having a content of terminal unsaturations in quantities of 0.1-1% by moles, said reactive extrusion process being performed with the addition of a compound selected from peroxides, epoxides and carbodiimides.

2. Biodegradable polyester as claimed in claim 1, characterized in that the polyester precursor has an MFI of 7-20 g/10 min at 190° C. and 2.16 kg, shear viscosity of 500-700 Pas with speed gradient g=100 s$^{-1}$ and having a content of terminal unsaturations in quantities of 0.1-0.8% by moles.

3. Biodegradable polyester as claimed in claim 1, characterized in that said reactive extrusion is performed by adding peroxides in quantities of 0.001-0.1%, epoxides in quantities of 0.05-1% by weight, carbodiimides in quantities of 0.05-1.5% by weight.

4. Biodegradable polyester as claimed in claim 1, characterized in that the polyester precursor is selected from the group of aliphatic and aliphatic-aromatic biodegradable polyesters.

5. Biodegradable polyester as claimed in claim 4, characterized in that the aliphatic biodegradable polyesters are obtained starting from aliphatic dicarboxylic acids and from aliphatic diols.

6. Biodegradable polyester as claimed in claim 5 characterized in that said aliphatic dicarboxylic acids have a number of carbons from $C_2$ to $C_{13}$.

7. Biodegradable polyester as claimed in claim 6, characterized in that the aliphatic dicarboxylic acid is sebacic acid.

8. Biodegradable polyester as claimed in claim 4, characterized in that the aliphatic-aromatic biodegradable polyesters have the aromatic part mainly composed of polyfunctional aromatic acids, and the aliphatic part composed of aliphatic dicarboxylic acids and aliphatic diols and mixtures thereof.

9. Biodegradable polyester as claimed in claim 8, characterized in that the dicarboxylic aromatic compounds are derivatives of phthalic acid and esters thereof, furandicarboxylic acid and esters thereof, and their combinations.

10. Biodegradable polyester as claimed in claim 8, characterized in that the aliphatic-aromatic polyesters have a content of aromatic acids of between 40 and 70% by moles.

11. Biodegradable polyester as claimed in claim 1, wherein the polyester is biodegradable according to the standard EN 13432.

12. Laminate product comprising at least a rigid or flexible backing and at least a first layer comprising a biodegradable polyester as claimed in claim 1.

13. Laminate product as claimed in claim 12, characterized in that the rigid backing is composed of one or more layers of paper and cardboard.

14. Laminate product as claimed in claim 12, characterized in that the flexible backing is composed of one or more flexible films.

15. Laminate product as claimed in claim 12, characterized in that the backing is composed of one or more rigid backing and of one of more flexible backing.

16. Articles obtained with laminate products according to claim 12 selected from the group consisting of boxes, cups, plates, food packaging, tubs for butter, margarine, bags or boxes for pet food, laminated paper foils for wrapping, containers and wrappers for different types of foods, cups for ice cream and yogurt, lids, flexible films for food packaging for food products sensitive to oxidation and/or humidity.

17. Extensible film obtained from a polyester as claimed in claim 1.

18. Multilayer film containing a polyester as claimed in claim 1.

19. Water barrier and oxygen barrier multilayer films and laminates containing a polyester as claimed in claim 1.

20. Composition comprising:
(A) a biodegradable aliphatic-aromatic polyester comprising units deriving from at least a diacid and at least a diol, said polyester having long chain branches, being essentially gel-free, and being characterized in the molten state by a Shear Viscosity, from 800 to 1,600 Pas measured according to the standard ASTM D-3835-90, at 180° C., a flow gradient $\gamma=103.7\ s^{-1}$ with a capillary D=1 mm, L/D=30; by a Thermal Stability Constant K of less than $1.5 \times 10^{-4}$ measured according to the standard ASTM D-3835- Appendix at 180° C. a flow gradient $\gamma=103.7\ s^{-1}$ with a capillary D=1 mm, L/D=30; by a Melt Strength from 2 to 4.5 g and by a Breaking Stretching Ratio>30; and polylactic acid.

\* \* \* \* \*